US006868138B2

(12) United States Patent
Clinthorne et al.

(10) Patent No.: US 6,868,138 B2
(45) Date of Patent: Mar. 15, 2005

(54) METHOD, PROCESSOR AND COMPUTED TOMOGRAPHY (CT) MACHINE FOR GENERATING IMAGES UTILIZING HIGH AND LOW SENSITIVITY DATA COLLECTED FROM A FLAT PANEL DETECTOR HAVING AN EXTENDED DYNAMIC RANGE

(75) Inventors: Neal H. Clinthorne, Ann Arbor, MI (US); Predrag Sukovic, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 168 days.

(21) Appl. No.: 10/157,282

(22) Filed: May 29, 2002

(65) Prior Publication Data

US 2003/0223532 A1 Dec. 4, 2003

(51) Int. Cl.[7] .............................................. H05G 1/64
(52) U.S. Cl. .................................................. 378/98.8
(58) Field of Search ............................... 378/98.8, 98.7; 250/370.09, 370.11

(56) References Cited

U.S. PATENT DOCUMENTS

| 4,623,928 A | | 11/1986 | Handy |
| 4,647,975 A | | 3/1987 | Alston et al. |
| 4,700,233 A | * | 10/1987 | Toshiaki ..................... 348/294 |
| 4,847,489 A | | 7/1989 | Dietrich |

(List continued on next page.)

FOREIGN PATENT DOCUMENTS

EP          1 206 119 A2     5/2002

OTHER PUBLICATIONS

Clinthorne, Neal H., et al., A Simple Algorithm For Restoring Images From Pixellated Radiation Detectors, presented at 1998 IEEE Nuclear Science Symposium Conference Record, Toronto, Ontario, Canada, Nov. 1998.

Nayar, S.K., et al., High Dynamic Range Imaging: Spatially Varying Pixel Exposures, presented at IEEE Conference On Computer Vision And Pattern Recognition, 2000.

Robertson, M.A., et al., Estimation–Theoretic Approach to Dynamic Range Improvement Using Multiple Exposures, May 7, 2000.

Viceconti, M., et al., Digital Dynamic Range Expansion Applied to X–Ray Densitometric Analysis of Total Hip Replacement, Journal of Biomedical Engineering, vol. 15., pp. 57–59, 1993.

(List continued on next page.)

Primary Examiner—Craig E. Church
(74) Attorney, Agent, or Firm—Brooks Kushman P.C.

(57) ABSTRACT

A method, processor and computed tomography (CT) machine for generating images utilizing high and low sensitivity data collected from a flat panel detector having an extended dynamic range. Hardware modifications for extending the dynamic range include grouping pixel rows and pixel columns into clusters of two. The sensitivity of the rows/columns is modified by positioning optical masks that have different transparencies for different rows/columns. Software modifications for extending the dynamic range include taking two correlated exposure scan measurements at each angle and combining the two data sets into one scan prior to image reconstruction. This method uses a spatially varying pixel exposure method where several adjacent pixels are clustered and each cluster has a different sensitivity. The signals of these clusters are combined to form one image effectively producing an increased dynamic range. The flat panel imager may be an a-Si:H based flat panel detector for use in X-ray imaging, including cone beam computer tomography (CBCT).

32 Claims, 2 Drawing Sheets

U.S. PATENT DOCUMENTS

| | | | |
|---|---|---|---|
| 5,099,505 | A | 3/1992 | Seppi et al. |
| 5,101,108 | A | 3/1992 | Gaalema et al. |
| 5,150,649 | A | 9/1992 | Kumaki et al. |
| 5,168,532 | A | 12/1992 | Seppi et al. |
| 5,177,445 | A | 1/1993 | Cross |
| 5,262,649 | A | 11/1993 | Antonu |
| 5,309,243 | A | 5/1994 | Tsai |
| 5,343,308 | A | 8/1994 | Johnston |
| 5,420,635 | A | 5/1995 | Konishi et al. |
| 5,455,621 | A | 10/1995 | Morimura |
| 5,541,705 | A * | 7/1996 | Kan et al. .................. 396/233 |
| 5,692,507 | A | 12/1997 | Seppi et al. |
| 5,717,223 | A | 2/1998 | Hack et al. |
| 5,789,737 | A | 8/1998 | Street |
| 5,801,773 | A | 9/1998 | Ikeda |
| 5,873,561 | A | 2/1999 | Bourkel et al. |
| 5,970,115 | A | 10/1999 | Colbeth et al. |
| 5,978,518 | A | 11/1999 | Oliyide et al. |
| 6,009,197 | A | 12/1999 | Riley |
| 6,041,097 | A | 3/2000 | Roos et al. |
| 6,067,342 | A | 5/2000 | Gordon |
| 6,069,361 | A | 5/2000 | Rubinstein |
| 6,098,463 | A | 8/2000 | Goldberg |
| 6,115,065 | A | 9/2000 | Pecht et al. |
| 6,130,713 | A | 10/2000 | Merrill |
| 6,137,533 | A | 10/2000 | Azim |
| 6,185,274 | B1 | 2/2001 | Kinno et al. |
| 6,232,606 | B1 | 5/2001 | Singh |
| 6,233,308 | B1 | 5/2001 | Hsieh |
| 6,256,370 | B1 | 7/2001 | Yavuz |
| 6,263,040 | B1 | 7/2001 | Hsieh |
| 6,272,207 | B1 | 8/2001 | Tang |
| 6,324,241 | B1 | 11/2001 | Besson |
| 6,379,041 | B1 | 4/2002 | Schuetz et al. |
| 6,486,808 | B1 | 11/2002 | Seppi et al. |
| 6,496,558 | B2 | 12/2002 | Graumann |
| 6,606,121 | B1 * | 8/2003 | Bohm et al. ................ 348/297 |
| 2001/0040632 | A1 | 11/2001 | Yang et al. |

OTHER PUBLICATIONS

Madden, Brian C., Extended Intensity Range Imaging, Department or Computer and Information Science, University of Pennsylvania, Philadelphia, PA, Technical Report MS–CS–93–96, 1993.

Robertson, M.S., et al., Dynamic Range Improvement Through Multiple Exposures, presented at International Conference on Image Processing, Kobe, Japan, 1999.

Mann, S., et al., On Being Undigital With Digital Cameras: Extending Dynamic Range By Combining Differently Exposed Pictures, presented at Society For Imaging Science And Technology 48$^{th}$ Annual Conference, Washington, D.C. 1995, pp. 1–7.

Debevec, P.E., et al., Recovering High Dynamic Range Radiance Maps From Photographs, presented at Siggraph 97, Computer Graphics Annual Conference Series, 1997, pp. 1–10.

Brajovic, V., et al., A Sorting Image Sensor: An Example of Massively Parallel Intensity–to–Time Processing For Low–Latency Computational Sensors, presented at 1996 IEEE International Conference on Robotics And Automation, Apr. 1996, pp. 1638–1643.

Lule, T., et al., Design and Fabrication of A High–Dynamic–Range Image Sensor in TFA Technology, IEEE Journal of Solid–State Circuits, vol. 34, pp. 704–711, May 1999.

* cited by examiner

METHOD, PROCESSOR AND COMPUTED TOMOGRAPHY (CT) MACHINE FOR GENERATING IMAGES UTILIZING HIGH AND LOW SENSITIVITY DATA COLLECTED FROM A FLAT PANEL DETECTOR HAVING AN EXTENDED DYNAMIC RANGE

BACKGROUND OF THE INVENTION

1. Field of the Invention

This invention relates to methods, processors and computed tomography (CT) machines for generating images utilizing high and low sensitivity data collected from a flat panel detector having an extended dynamic range.

2. Background Art

Figure 1:
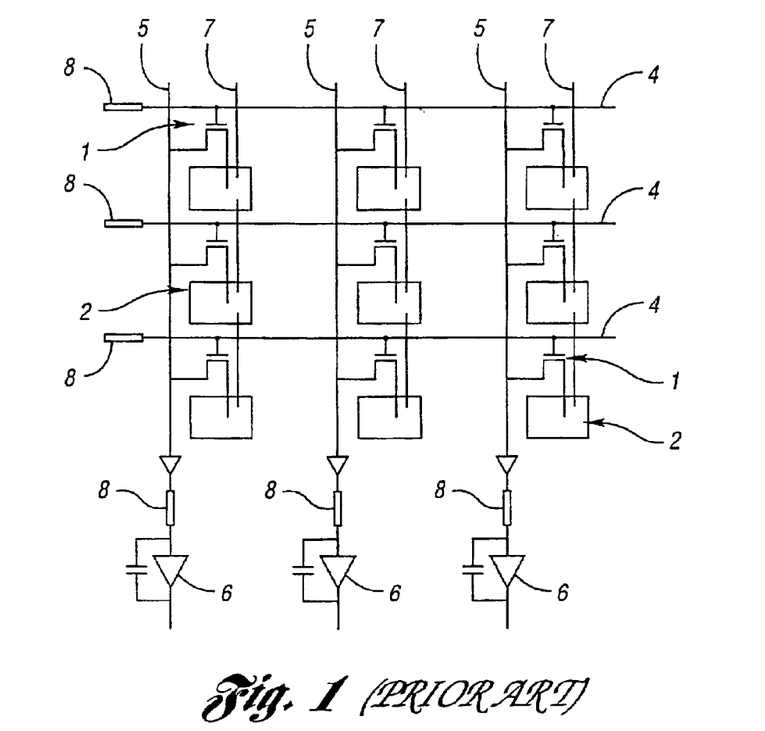
FIG. 1 is a schematic diagram of a portion of a prior art a-Si:H flat panel array.
Figure 2:
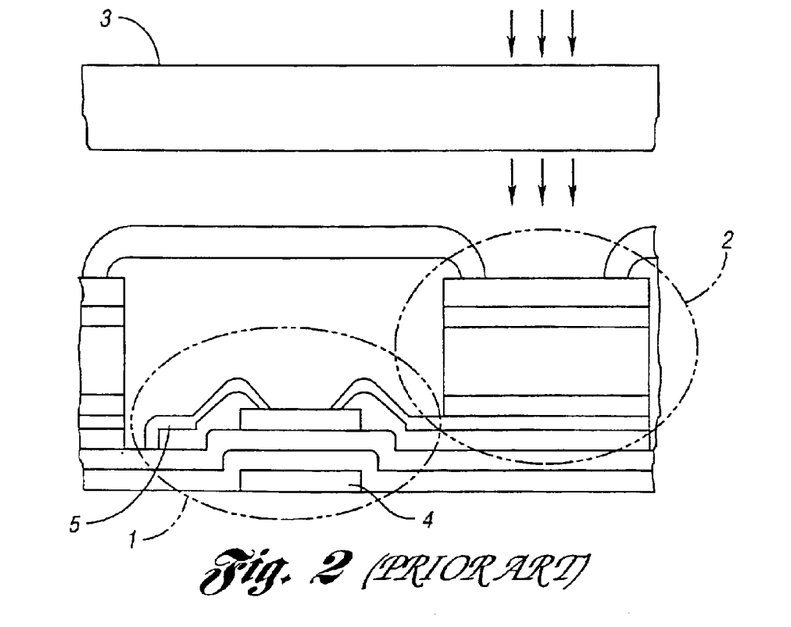
FIG. 2 is a schematic diagram of a pixel from a prior art a-Si:H flat panel array.

Referring to FIGS. 1 and 2, flat panel imagers (also referred to as flat panel arrays or flat panel detectors) (i.e., FPIs) are large-area arrays with pixels consisting of a hydrogenated amorphous silicon (a-Si:H) thin-film transistor 1 (TFT) coupled to an a-Si:H photodiode sensor 2, as shown in U.S. Pat. No. 5,262,649.

On top of the array is an X-ray converter 3 based on a phosphor material such as $Gd_2O_2S$:Tb or scintillating material such as CsI:(T1). When an X-ray photon reaches the X-ray converter 3 (also referred to as a screen), it stimulates the emission of light photons which are then detected by the reverse-biased photodiode sensor 2. The reverse bias, together with a large intrinsic region of the diode, creates a capacitor in which the light photons generate electron hole pairs that effectively discharge the capacitor. The amount of discharge constitutes the information. During this phase, the TFT 1 is in the "off", or non-conducting, position which is achieved by setting its control line 4 (also referred to as gate line) to a negative voltage (e.g., −5V). In the next phase—readout phase—an entire row of TFTs is set to the "on" or conducting position by setting their gate line 4 to +5V, allowing the charge to flow out through all DATA lines 5 simultaneously, while at the same time recharging the capacitor for the next cycle. The charge is then amplified via external charge-sensitive amplifiers 6 and digitized. Bias lines 7 and contact pads 8 are also typically provided.

Flat panel imagers have the potential of replacing conventional detectors and radiographic film in some areas of medical imaging. The spatial resolution that can be achieved with these detectors supersedes that of the other detector technologies. The sizes in which they can be manufactured are larger than those of charge coupled devices (CCD) based detectors. Several researchers have reported attempts to use FPIs for cone beam tomography (CBCT). However, their use in tomography has been hampered by various problems, such as gain and offset fluctuations, image lag, readout noise, slow readout rate, etc. One of the major problems is an inadequate dynamic range of FPIs for most tomographic applications which require a good low contrast resolution.

The dynamic range of these detectors is the ratio between the largest and smallest X-ray exposures that can be detected. The largest detectable signal is defined as the signal that saturates the detector while the smallest signal is the noise level in the signal. As a consequence of the small dynamic range, an image of an object that varies in density considerably will have areas that are either overexposed (saturated) or underexposed (below noise level). One faces an analogous problem in photography—when the photographed scene has both high and low light areas, parts of the photograph will appear either as too bright, or even uniformly white, due to overexposure, or too dark, or even uniformly black due to underexposure.

The dynamic range of flat panel detectors is of the order of magnitude of 10,000 while the range that is needed for CT is of the order of 1,000,000. It follows that in order to make a tomographic device based on these detectors, a method for improving their dynamic range needs to be developed.

Similar Technologies

There are a number of existing approaches for capturing a high dynamic range image with a low dynamic range image detector. While some of the methods originate from the field of X-ray imaging, most proposed methods originate from other fields including optical imaging (photography and video), ultrasound imaging, infrared imaging, and digitizing scanners. Overviews are given in references [2] and [3]. Also, by modifying slightly Nayar's classification [2], one may classify the existing methods into five groups: sequential exposure change, multiple image detectors, multiple sensor elements within a pixel, alternative pixel designs, and spatially varying pixel exposures. Each group will be briefly described and representative methods referenced.

Sequential Exposure Change

In this approach, the scene is usually pictured twice, one time with high exposure, the other time with low exposure. The two images are then combined through a mathematical algorithm. The resulting image effectively has an increased dynamic range over the two images it was made from.

This approach has been applied by Viceconti [4] to expand the dynamic range of film in X-ray densitometric analysis of total hip replacement. The final image is generated calculating for each pixel the value: $L_{DE}=L_{LE}+L_{HE}$, where $L_{DE}$ is the gray level value in the final image, $L_{LE}$ is the gray level exposure in the low exposure image and $L_{HE}$ is the gray level exposure in the high exposure image.

A similar approach has been used by Madden [5] for CCD cameras in optical imaging. Instead of combining the images, Madden, however, takes into account only the highest exposure for a given pixel at which the pixel does not saturate. He justifies this by pointing out that pixels observed at higher exposure times have less quantization noise than do pixels taken at lower exposure. This is effectively a "cut and paste" approach since the parts of the high exposure image which do not saturate are pasted into the final image and the complementary parts are pasted from the low exposure image.

Robertson et al. [3, 6] have improved Madden's approach by eliminating what they perceived as two limitations of his approach. First, in Madden's approach, the camera response is assumed to be linear, which it usually is not (especially in case of consumer video cameras), and the authors propose a method for estimating the camera response. Second, as mentioned above in this "cut and paste" method, only one pixel from the multiple images is used in the final image, and the authors propose that the final image be obtained as a weighted sum of the multiple images. The weights are chosen based on our confidence that the observed data is accurate. For CCD cameras, the data are most accurate if it falls in the middle of the detector range, for example for 8 bit images, which are in the range of 0–255, the most confidence will be for the values around 128 and the least confidence for values around 0 and around 255. Consequently, the authors weight the data with a Gaussian function around 128 and use a maximum likelihood approach to estimate the values.

Similar approaches to Robertson's had been previously proposed in [7] and [8]. Methods and devices for extending the dynamic range of electronic imaging systems based on multiple exposures are also the subject of patents [9], [10] and [11].

Another method is proposed by Alston [12], in which the image of the scene is recorded during a first exposure interval in which the scene light is not artificially illuminated and a second exposure interval illuminated by a flash of artificial illumination. The two images are then combined into a wider dynamic range image.

Seppi et al. [13] describe a dual exposure method for extending the dynamic range of an image intensifier tube (IIT) based X-ray CT detector. This method is also part of patents [14, 15] [16]. The charge accumulated in the photodiodes is sampled using a long and a short sampling interval. When the magnitude of the visible light output from the IIT exceeds a threshold value, the measurement from the short sampling interval is used. Conversely, when the magnitude is less than the threshold value, the measurement from the long sampling interval is used. When the measurement from the short interval is used, it is multiplied by a scaling factor. This scaling factor is determined with a calibration light source by comparing the long interval measurement to the short interval measurement. The scaling factor is then adjusted to obtain a best least squares fit between the long interval measurement and the scaled short interval measurement. The threshold value for use of the short interval measurement is selected to be at a point close to, but less than, the saturation level for the photodiodes. In practice, the transition between use of the short interval measurement and the long interval measurement is made by using a weighted combination of the long interval sample and the short interval. In one embodiment of the invention, a transition range of sample magnitudes is defined, and for sample magnitudes below the transition range, the long interval measurement is used. For sample magnitudes above the transition range, the scaled short interval measurement is used. Finally, for sample magnitudes within the transition range, the weighted combination is used. In order to maintain X-ray photon statistics on a 16" (40 cm) diameter body, a detector with a minimum signal-to-noise ratio (S/N) of at least 200,000:1 is necessary. This is assuming a typical surface dose of 2 rads/scan and no compensating bolus around the patient. It is also necessary that the IIT, lens optics and photodetector yield an X-ray to electron quantum efficiency of greater than unity.

Multiple Image Detectors

Primarily used in optical imaging, this method utilizes two detectors with different sensitivities that take a picture of the scene at the same time (by using beam splitters, for example). The two images are then combined through a mathematical algorithm into one image with effectively an increased dynamic range. An example is the method by Ikeda [17].

As noted by Nayar [2], a major disadvantage of these methods is their cost due to the need for multiple detectors, precision alignment optics and additional image capture hardware.

Multiple Sensor Elements Within a Pixel

An example of a method that utilizes multiple sensor elements within a pixel is the one proposed by Street [18]. The method is intended to improve the dynamic range of a-Si:H flat panel imaging arrays. The sensor area of each pixel is segmented into a plurality of discrete portions. Each discrete portion has a distinctive responsiveness to incident illumination, either with regard to capacitance or sensitivity. The portions are in common communication with a data line where the charges are being summed. Since the dynamic range of the cumulative discrete portions is greater than any single one sensor portion, a wider dynamic range for sensor operability is achieved. An additional benefit according to the author is a nonlinear response to the incident light which, as such, mimics the human eye and further improves the dynamic range. Paper by Nayar [2] references similar solutions for CCD cameras.

Alternative Pixel Designs

References [19] and [20] propose detector designs where each pixel on the device includes a computational element that measures the time it takes to attain full potential well capacity. Since the full-well capacity is the same for all pixels, the time to achieve it is proportional to image irradiance. The recorded time values are read out and converted to a high dynamic range image. Wen [21] describes a high dynamic range CCD design. The high dynamic range is achieved by providing the charge-coupled device with a nonlinear relationship between the charge accumulated in the photosite and the charge which is transferred out to surrounding circuitry from the photosite.

Merrill [22] proposes a design of a CMOS active cell design with self-reset. Each time the signal from a cell reaches the preset threshold value, the cell is reset and the number of resets is stored for each cell. By resetting the cell a plurality of times, the dynamic range is increased.

Azim [23] describes an imager (CCD, CMOS, . . . ) which utilizes a per-pixel automatic gain control as a means for achieving a higher dynamic range.

Handy [24] proposes a hardware modification of a CCD camera in which the photoelectric charge is injected directly from the photosite area to the output shift register.

Spatially Varying Pixel Exposures

In approaches from this group, several neighboring pixels are clustered and each pixel in the cluster has different sensitivity. The signals from the pixels in the cluster are then combined through a mathematical algorithm into one image with effectively an increased dynamic range. Different sensitivities can be achieved in various ways including: placing a mask with cells of different optical transparencies in front of the array (in optical imaging), etching the pattern on the detector, or using different integration times for different pixels. Nayar [2] suggested an approach that extends the dynamic range of a CCD camera in this manner.

Kan [25] proposes a modification of a CCD camera in which the dynamic range is extended through control of the light intensity level in an image on a pixel-by-pixel basis. In one aspect, a multi-faceted light controller is used like a variable iris camera, but on a pixel-by-pixel basis.

Gaalema [26] proposes a method for extending the dynamic range of infrared image sensing arrays. Infrared sensing arrays are two dimensional arrays of pixels. While scanning, they generally move in the direction normal to the orientation of their columns. The columns are time-delayed and averaged so that effectively only one column is scanned.

Patent [27] describes an extended dynamic range image digitizing apparatus used to digitize image-containing-media into electronic form. The dynamic range is extended by either controlling the illumination of the image surface or the time that the detector is sensitive to the light, or both.

Other Relevant References

Relevant, but so far not referenced documents are: [28], [29] and [30]. A pixel binning method in X-ray detectors including a-Si:H flat panel detectors is a subject of [31].

All bracketed numbered references referred to herein are listed in Appendix A.

The U.S. Pat. No. 5,978,518, to Oliyide et al., provides for image enhancement in digital image processing. Disclosed is a process to enhance a digital image, focusing on enhancement of medical radiographic images. Initially, an image is decomposed into low and high frequency images. A dynamic range modification is performed on the low frequency image and the high frequency image is modified through noise estimation, anatomical regions of importance, and edge estimation. These separate images are then combined together to form a finalized image. Additionally, pixel values of the finalized image may be shifted to map the values into a desired range.

The U.S. Pat. No. 6,067,342, to Gordon, provides for a digital filmless X-ray projection imaging system and method. Disclosed is a system and method for producing digital X-ray projection images. The process of obtaining the image includes a plurality of detectors, which receive the X-ray beams, and are rotated about the transmission axis to generate a set of projection data at a plurality of angular positions. The detector array can be arranged in two rows offset from each other to effectively provide higher quality image data. Once a complete set of projection data is obtained, a reconstruction computer processes the data set combining projection data at the different angles to produce the desired range.

The U.S. Pat. No. 6,263,040 B1, to Hsieh, provides methods and apparatus for cone-tilted parallel sampling and reconstruction. Disclosed is a method for generating an image using a digital flat panel detector. The digital X-ray panel includes a plurality of detector cells and uses a predefined triggering sequence to activate a signal activation line. This sequence provides a set of parallel and tilted parallel samples where projections are then collected relating to the tilted parallel beam geometry. With these projections, an image is then generated using a specific reconstruction algorithm.

The U.S. Pat. No. 6,272,207 B1, to Tang, provides a method and apparatus for obtaining high-resolution digital X-ray and gamma ray images. Disclosed is a device that produces high-resolution X-ray and gamma ray images. The device consists of a radiation mask composed of both an opaque portion and a plurality of apertures. As the radiation mask moves across the object, the apertures allow selected portions to be imaged by the detector effectively decreasing charge smear due to an X-ray incidence angle close to zero. The steps of moving the detector pixels and mask are repeated until every portion of the object is imaged. This digital data is then combined to produce a high resolution image of the object.

The following U.S. patents are also related to the present invention: U.S. Pat. Nos. 5,717,223; 6,009,197; 6,041,097; 6,069,361; 6,232,606 B1; 6,233,308 B1; 6,256,370 B1; and 6,324,241 B1.

SUMMARY OF THE INVENTION

In view of the above, an object of the present invention is to provide an improved method, processor and computed tomography (CT) machine for generating images utilizing high and low sensitivity data collected from a flat panel detector having an extended dynamic range.

In carrying out the above object and other objects of the present invention, a method for generating an image using a flat panel detector is provided. The detector includes an array of detector pixels and a control line provided for each pixel row to activate each pixel in each respective row. The method includes obtaining high and low sensitivity data from the detector using at least one of: a predetermined triggering sequence, a plurality of optical masks having different transparencies for different rows/columns of the array, and a plurality of charge amplifiers having different amplifications for different columns of the array. The method also includes using the obtained data to generate an image wherein the detector has an extended dynamic range.

The optical masks may be positioned between the detector pixels and a converter of the detector. The converter converts radiation into visible light.

The triggering sequence may control exposure time of the pixels so that exposure times of adjacent pixels in a column are different.

The charge amplifiers may controllably amplify charges retrieved from the pixels so that amplification levels of adjacent pixels in a row are different.

The step of obtaining the data may be controlled from scan to scan based on attenuation properties of a scanned object.

The image may be generated using a reconstruction algorithm.

The high and low sensitivity data may be combined prior to using the reconstruction algorithm or the reconstruction algorithm may use the high and low sensitivity data.

Further in carrying out the above object and other objects of the present invention, a processor is provided for reconstructing an image using high and low sensitivity data collected from a flat panel detector. The detector includes an array of detector pixels and a control line provided for each pixel row to activate each pixel in each respective row. The processor is programmed to obtain high and low sensitivity data from the detector using at least one of: a predetermined triggering sequence, a plurality of optical masks having different transparencies for different rows/columns of the array, and a plurality of charge amplifiers having different amplifications for different columns of the array. The processor is further programmed to generate an image using the obtained data wherein the detector has an extended dynamic range.

The optical masks may be positioned between the detector pixels and a converter of the detector. The converter converts radiation into visible light.

The triggering sequence may control exposure time of the pixels so that exposure times of adjacent pixels in a column are different.

The charge amplifiers may controllably amplify charges retrieved from the pixels so that amplification levels of adjacent pixels in a row are different.

The processor may be programmed with a reconstruction algorithm.

The processor may be further programmed to combine the high and low sensitivity data prior to using the reconstruction algorithm or the reconstruction algorithm may use the high and low sensitivity data.

Still further in carrying out the above object and other objects of the present invention, a computed tomography machine is provided which includes a flat panel detector. The detector includes an array of detector pixels and a control line provided for each pixel row to activate each pixel in each respective row. The computed tomography machine also includes a processor for reconstructing an image using data collected from the detector. The processor is programmed to obtain high and low sensitivity data from the detector using at least one of: a predetermined triggering sequence, a plurality of optical masks having different transparencies for different rows/columns of the array, and a plurality of charge amplifiers having different amplifications for different columns of the array. The processor is further programmed to generate an image using the obtained data wherein the detector has an extended dynamic range.

The optical masks may be positioned between the detector pixels and a converter of the detector. The converter converts radiation into visible light.

The triggering sequence may control exposure time of the pixels so that exposure times of adjacent pixels in a column are different.

The charge amplifiers may controllably amplify charges retrieved from the pixels so that amplification levels of adjacent pixels in a row are different.

The processor may be programmed with a reconstruction algorithm.

The processor may be programmed to combine the high and low sensitivity data prior to using the reconstruction algorithm or the reconstruction algorithm may use the high and low sensitivity data.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

In general, the present invention extends the dynamic range of flat panel detectors. It consists of two parts: 1) hardware modifications on the detector; and 2) software method of combining the signals that the detector outputs. Several hardware modifications and several software method are proposed. Each of the hardware methods can be used in combination with each of the software methods. Also, the hardware methods can be combined between themselves in addition to being combined with a software method. Finally, a method is proposed for automatic estimation of the parameters used in hardware modifications 1 and 2.

Hardware Modifications

1. The pixel rows are grouped into clusters of two: two neighboring pixels, one from each row, are combined to form a new pixel. The two pixels share the same DATA line (for example 1' and 1" in FIG. 3). The exposure of one of the two pixels (for example 1') is set to a low value, while the exposure of the other pixel (1") is set to a high value. The exposure is controlled by exposure time, which is the time during which Control Lines are in the "off" position. A low exposure for Pixel 1' is achieved by setting its Control Line (4') time to a low value, while a high exposure of Pixel 1" is achieved by setting its Control Line (4") time to a higher value. The signal values for the two pixels are read out through their common DATA line in succession and further processed by the software methods.

2. The pixel columns are grouped into clusters of two: two neighboring pixels, one from each column, are combined to form a new pixel. The two pixels share the same FET Control Line (for example 5' and 5" in FIG. 3). The amplification of the external charge amplifier of one of the two pixels (for example 6') is set to a low value (G), while the amplification of the other pixel (6") is set to a high value (for example 10*G). The signal values for the two pixels are then further processed by the software methods.

Figure 3:
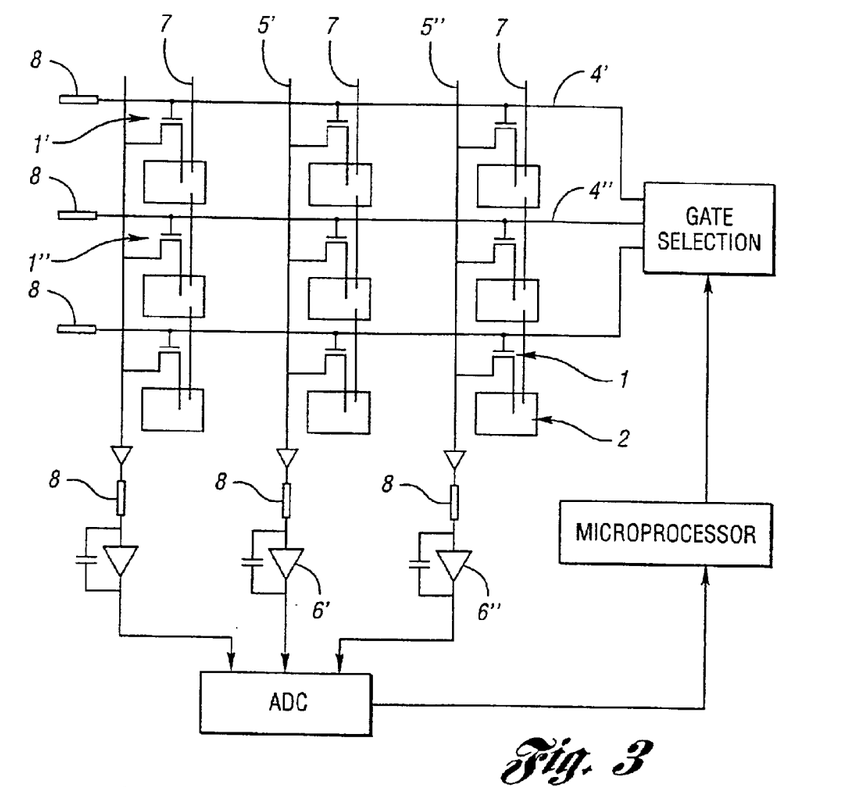
FIG. 3 is a schematic diagram of a portion of an a-Si:H flat panel array and programmed microprocessor of the present invention.

3. The sensitivity rows/columns can be modified by placing optical masks that would have different transparencies between the X-ray converter 3 and the pixels for different rows/columns.

Automatic Estimation of Exposure Levels

Since the exposure time and amplifier gain can be controlled and easily changed from scan to scan, hardware modifications 1 and 2 allow for adaptive control over the exposure levels depending on the attenuation properties of the scanned object. One can take scout scans of the object at several exposures and based on the data values determine the optimum values for either exposure time or amplifier gain or both (in case the two methods are combined).

Software Methods

The first step in processing the data is to scale the values that come from low sensitivity pixels to the same level as high sensitivity pixels by multiplying them with a multiplication factor that represents the ratio of the high and low sensitivities. The ratio of the sensitivities is equal to the ratio of low and high Control Line time, Charge Amplifiers amplification or transparencies in the case of hardware methods 1, 2 and 3, respectively. The two sets of values are further combined into one through an appropriate method. The resulting values correspond to the "effective" pixels which are comprised of pixels such as 1' and 1". The simplest way to combine the values is to store only the value from the higher exposure in case it did not saturate, and in case it did saturate store the lower exposure value. This is basically a "cut and paste" method. Very simple and intuitive, this method, however, does not utilize all the information that is available to use from the detector. Three software methods are proposed for combining the data.

A. A method is proposed that utilizes the information available in both output values from the detector, and thus reduces the noise in the signal. It has been suggested by Clinthorne in [1]. The method takes into account the statistical nature of the signals from a-Si:H detectors. A least squares objective function is formed:

$$\phi_\alpha(\lambda)=(y-g(D\lambda))^T K^{-1}(y-g(D\lambda))+\alpha\lambda^T R\lambda,$$

where λ is a column vector of concatenated rows (or columns) of the imaging array's incident photon flux, y is a column vector of concatenated measurements of the incident flux, $K^{-1}$ is an error weighting matrix, which should be the inverse of the covariance of the measurement noise, D is an N×N response modifier matrix representing different acquisition times of the pixels, and g(·) is the intrinsic system response. The saturated signals are assigned a weight of zero. The last term is a penalty function which consists of the sum of the squared differences between each pixel and its neighbors. Appropriate choice of weights K assures that measurements will be correctly combined with respect to their intrinsic noise levels. The proposed objective function is minimized by a Gauss-Seidel method leading to the values of λ. After the values for λ are determined, they are further processed through any of numerous available tomographic image reconstruction methods to obtain cross-sectional tomographic images.

B. A simpler version of the previous method is to make the resulting pixel be equal to a weighted sum of the two values where the weights equal the inverse of the variance of the pixels.

$$\lambda = \frac{k_1 y_1 + k_2 y_2}{k_1 + k_2},$$

where $y_1$ and $y_2$ are the signal values from the high and low exposure pixels, respectively $k_1$ and $k_2$ are the corresponding weights which equal $1/\sigma_1^2$ and $1/\sigma_2^2$, respectively, where $\sigma_1^2$ and $\sigma_2^2$ are the variances. Saturated pixels are assigned a weight of zero. It should be noted here, that by using this method, the increase in the dynamic range is achieved at the expense of spatial resolution since "the effective" pixel row is twice as wide as the two original, or "physical" rows. For example, the detector used in our laboratory has the row width, as well as the column width, of 0.4 mm. The original pixel size is thus 0.4 by 0.4 mm, and the resulting pixels is 0.4 mm by 0.8 mm. After the values for λ are determined, they are further processed through any of available tomographic image reconstruction methods to obtain cross-sectional tomographic images.

C. In this method, which is the preferred method, the data from the two sets of pixels are not combined prior to the tomographic image reconstruction step, but the tomographic image reconstruction method itself is modified so it uses the two data sets. This image reconstruction method has to be from the group of iterative reconstruction methods. The iterative reconstruction methods generally use a weighting matrix that assigns different weights to different projections based on some estimate of the amount of information that projection carries. This weighting matrix can be adapted so as to assign different weights to pixels with different exposures.

D. This method is an improvement that can be applied to either of the software methods A–C. In it, any of the three methods is modified in such a way that the two pixels are combined into a larger pixel only when the high exposure pixel is saturated. In all other cases, the two pixels are not combined and thus the original spatial resolution in that part of the detector is maintained. As a result, the spatial resolution is compromised only in the regions where the saturation has occurred, not throughout the entire detector.

Figure 4:
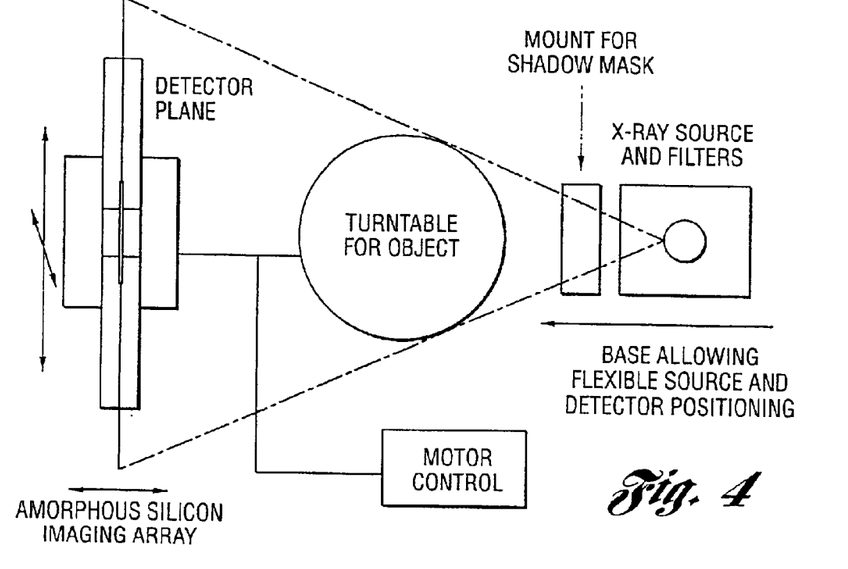
FIG. 4 is a schematic diagram of a system which can use the present invention.

Referring now to FIG. 4, there is illustrated a system or an X-ray CT test bench which can utilize the present invention. In general, an object is scanned two times, each time with a different exposure: a high and low exposure at each angle. From the two scans, a joint scan is formed as a weighted sum, where the weights for each scan and detector element are inversely proportional to the variance of the corresponding signal. The weights for saturated pixels are set to zero. The combined scan or image is then reconstructed using a standard filtered back projection (FBP) method.

The system includes an X-ray source, a computer-controlled object turntable, an amorphous silicon (a-Si:H) detector array and mounts for various components such as shadow-masks, source-collimators, and scatter-rejection grids. The a-Si:H detector array may be EG&G RID 512-400 with a Lanex screen (size: 20×20 cm; number of pixels: 512×512; pixel size: 400×400 μm). The detector may be translated horizontally to emulate a larger detector (translator not shown). The acquisition times may be set to 200 ms and 800 ms for the low- and high-exposure scans, respectively.

The source may be a Philips 160 Kvp constant potential source with a 400 μm focal spot size. Source potential may be set to 120 V and the current 2 mA. The beam was filtered with 1 mm of Al and 0.5 mm of Cu. Beam collimation to about 5 mm was used to reduce the effect of Compton scatter.

The parameters of the reconstructed image and imaging geometry are as follows: image size: 660×660 pixels, number of angular projections: 576; pixel size 0.4 mm, source-to-source detector distance 1345.70 mm, and object-to-detector distance 255.71 mm.

Unlike a number of existing methods, the methods described herein do not discard any of the acquired data but use all the available information in the data in a statistically efficient way by applying the proposed software methods. Another important characteristic of the proposed methods is that they can be implemented inexpensively compared to other methods that call for hardware modifications. This is due to the fact that no modifications are done on the detector array itself, but only on the readout electronics or the transparency mask. Existing methods that apply hardware modifications do so on the detector array itself and the budget needed just to change the production process to accommodate them is well over $1 million. The budget necessary for the method proposed herein is much lower and in some case can be as low as several hundred dollars.

APPENDIX A

[1] N. H. Clinthorne and J. Strobel, "A Simple Algorithm for Restoring Images From Pixellated Ratiation Detectors" presented at 1998 IEEE Nuclear Science Symposium Conference Record, Toronto, Ont., Canada, 1998.

[2] S. K. Nayar and T. Mitsunaga, "Higher Dynamic Range Imaging: Spatially Varying Pixel Exposures" presented at IEEE Conference On Computer Vision And Pattern Recognition, 2000.

[3] M. A. Robertson, S. Borman, and R. L. Stevenon, "Estimation-Theoretic Approach to Dynamic Range Improvement Using Multiple Exposures", 2000.

[4] M. Viceconti, F. Baruffaldi, W. Gaiba, A. Toni, A. Sudanese, and A. Giunti, "Digital Dynamic Range Expansion Applied to X-ray Densitometric Analysis of Total Hip Replacement", Journal Of Biomedical Engineering, Vol. 15, pp. 57–9, 1993.

[5] B. Madden, "Extended Intensity Range Imaging", Department of Computer and Information Science, University of Pennsylvania, Philadelphia, Pa. Technical Report MS-CS-93-96, 1993.

[6] M. S. Robertson, S. Borman, and R. L. Stevenson, "Dynamic Range Improvement Through Multiple Exposures", presented at International Conference On Image Processing, Kobe, Japan, 1999.

[7] S. Mann and R. W. Picard, "On Being 'Undigital' With Digital Cameras: Extending Dynamic Range By Combining Differently Exposed Pictures", presented at Society For Imaging Science And Technology 48th Annual Conference, Washington, D.C., 1995.

[8] P. E. Debevec and J. Malik, "Recovering High Dynamic Range Radiance Maps From Photographs", presented at SIGGRAPH 97, Computer Graphics Annual Conference Series, 1997.

[9] Y. T. Tsai, "Method and Apparatus for Extending the Dynamic Range of an Electronic Imaging System" (U.S. Pat. No. 5,309,243). 1994.

[10] A. Morimura, "Imaging Method for a Wide Dynamic Range and an Imaging Device for a Wide Dynamic Range" (U.S. Pat. No. 5,455,621), 1995.

[11] K. Masahiro, M. Tsugita, and K. Masukane, "Video Camera, Imaging Method Using Video Camera, Method of Operating Video Camera, Image Processing Apparatus and Method, and Solid-State Electronic Imaging Device (U.S. Pat. No. 5,420,635), 1995.

[12] L. E. Alston, D. S. Levinstone and W. T. Plummer, "Exposure Control System for an Electronic Imaging Camera Having Increased Dynamic Range" (U.S. Pat. No. 4,647,975), 1987.

[13] E. J. Seppi, E. G. Shapiro and R. L. Anderson, "Computer Tomography Apparatus Using Image Intensifier Detector" (U.S. Pat. No. 5,692,507), 1997.

[14] E. J. Seppi, E. G. Shapiro and J. M. Pavkovich, "Electronically Enhanced X-Ray Detector Apparatus" (U.S. Pat. No. 5,177,445), 1992.

[15] E. J. Seppi, E. G. Shapiro and J. M. Pavkovich, "Method for Improving the Dynamic Range of an Imaging System" (U.S. Pat. No. 5,168,532), 1992.

[16] E. J. Seppi, E. G. Shapiro and J. M. Pavkovich, "Method for Increasing the Accuracy of a Radiation Therapy Apparatus (U.S. Pat. No. 5,099,505), 1992.

[17] E. Ikeda, "Image Data Processing Apparatus for Processing Combined Image Signals in Order to Extend Dynamic Range" (U.S. Pat. No. 5,801,773), 1998.

[18] R. A. Street, "High Dynamic Range Segmented Pixel Array (U.S. Pat. No. 5,789,737), 1998.

[19] V. Brajovic and T. Kanada, "A Sorting Image Sensor: An Example of Massively Paralled Intensity-to-Time Processing for Low-Latency Computational Sensors", presented at 1996 IEEE International Conference On Robotics And Automation, 1996.

[20] T. Lule, B. Schneider, and M. Bohm, "Design and Fabrication of a High-Dynamic-Range Image Sensor in TFA Technology", IEEE Journal Of Solid-State Circuits, Vol. 34, pp, 704–11, 1999.

[21] D. D. Wen, "High-Dynamic Range Charge-Coupled Device" (U.S. Pat. No. 5,873,561), 1989.

[22] R. B. Merrill, "CMOS Active Pixel Cell With Self Reset For Improved Dynamic Range" (U.S. Pat. No. 6,130,713), 2000.

[23] K. S. Azim, "System and Method for Enhancing Dynamic Range in Images" (U.S. Pat. No. 6,137,533), 2000.

[24] R. J. Handy, "High Dynamic Range CCD Detector/Imager" (U.S. Pat. No. 4,623,928), 1986.

[25] M. Kan and K. C. Kitlas, "Camera With Large Dynamic Range" (U.S. Pat. No. 5,541,705), 1996.

[26] S. D. Gaalema and T. Y. Chuh, "Split Dynamic Range Using Dual Array Sensor Chip Assembly" (U.S. Pat. No. 5,101,108), 1992.

[27] G. E. Johnston, "Extended Dynamic Range Image Digitizing Apparatus" (U.S. Pat. No. 5,343,308), 1994.

[28] A. Kinno, M. Atsuta, T. Sakaguchi, M. Tanaka, M. Ikeda, and K. Suzuki, "Imaging Detecting Device and an X-Ray Imaging System" (U.S. Pat. No. 6,185,274), 2001.

[29] R. H. Wake and R. J. Grable, "Detector Array With Variable Gain Amplifiers for Use in a Laser Imaging Apparatus" (U.S. Pat. No. 5,150,649), 2000.

[30] J. Goldberg, "Method and Apparatus for Measurement of Wide Dynamic Range Signals" (U.S. Pat. No. 6,098,463), 2000.

[31] R. E. Colbeth, J. M. Pavkovich, E. J. Seppi, and E. G. Shapiro, "Multiple Mode Digital X-Ray Imaging System (U.S. Pat. No. 5,970,115), 1999.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for generating an image using a flat panel x-ray detector, the detector including an array of detector pixels and a control line provided for each pixel row to activate each pixel in each respective row, the method comprising:

converting x-ray radiation into light detectable by the detector pixels;

obtaining high and low sensitivity data from the detector and extending the dynamic range of the detector using at least one technique from the group consisting of: a predetermined triggering sequence in which predetermined integration times of adjacent pixels are different; a plurality of optical masks having different transparencies for different rows/column of the array; and a plurality of charge amplifiers having different amplifications for different columns of the array; and using the obtained data to generate an image.

2. The method as claimed in claim 1 wherein the steps of obtaining and extending are performed using the plurality of optical masks, the optical masks being positioned between the detector pixels and a converter of the detector, the converter performing the step of converting x-ray radiation into light detectable by the detector pixels.

3. The method as claimed in claim 1 wherein the steps of obtaining and extending are performed using the predetermined triggering sequence, the triggering sequence controlling integration time of the pixels so that predetermined integration times of adjacent pixels in a column are different.

4. The method as claimed in claim 1 wherein the steps of obtaining and extending are performed using the plurality of charge amplifiers, the charge amplifiers controllably amplifying charges retrieved from the pixels so that amplification levels of adjacent pixels in a row are different.

5. The method as claimed in claim 1 wherein the step of obtaining is controlled from image to image based on attenuation properties of a scanned object.

6. The method as claimed in claim 1 wherein the image is generated using a reconstruction algorithm.

7. The method as claimed in claim 6 wherein the high and low sensitivity data are combined prior to using the reconstruction algorithm.

8. The method as claimed in claim 6 wherein the reconstruction algorithm uses the high and low sensitivity data.

9. A processor and a flat panel detector, the processor reconstructing an image using high and low sensitivity data collected from the flat panel detector, the detector including an array of detector pixels and a control line provided for each pixel row to activate each pixel in each respective row, the detector further including a converter, the processor programmed to:

obtain high and low sensitivity data from the detector and extend a dynamic range of the detector using at least one technique selected from the group of: a predetermined triggering sequence in which predetermined integration times of adjacent pixels are different; a plurality of optical masks between the detector pixels and the converter, the optical masks having different transparencies for different rows/columns of the array; and a plurality of charge amplifiers having different amplifications for different columns of the array; and generate an image using the obtained data.

10. The processor and flat panel detector as claimed in claim 9 wherein obtaining high and low sensitivity data from the detector is performed using the optical masks, and the converter converting radiation into light detectable by the detector pixels.

11. The processor and flat panel detector as claimed in claim 9 wherein obtaining high and low sensitivity data from the detector is performed using the predetermined triggering sequence and the triggering sequence controls integration time of the pixels so that integration times of adjacent pixels in a column are different by a predetermined amount.

12. The processor and flat panel detector as claimed in claim 9 wherein obtaining high and low sensitivity data from the detector is performed using the charge amplifiers and the charge amplifiers controllably amplify charges retrieved from the pixels so that amplification levels of adjacent pixels in a row are different.

13. The processor and flat panel detector as claimed in claim 9 wherein the processor is programmed with a reconstruction algorithm.

14. The processor and flat panel detector as claimed in claim 13 wherein the processor is programmed to combine the high and low sensitivity data prior to using the reconstruction algorithm.

15. The processor and flat panel detector as claimed in claim 13 wherein the reconstruction algorithm uses the high and low sensitivity data.

16. A computed tomography machine comprising:
    a flat panel detector having a converter, the detector including an array of detector pixels and a control line provided for each pixel row to activate each pixel in each respective row; and
    a processor for reconstructing an image using data collected from the detector, the processor programmed to:
        obtain high and low sensitivity data from the detector and extend the dynamic range of the detector using at least one technique from the group consisting of: a predetermined triggering sequence in which integration times of adjacent pairs of pixels differ by a predetermined amount, a plurality of optical masks having different transparencies for different rows/columns of the array and a plurality of charge amplifiers having different amplifications for different columns of the array; and
        generate an image using the obtained data.

17. The machine as claimed in claim 16 wherein the processor is programmed to use the optical masks and the optical masks are positioned between the detector pixels and the converter, the converter converting radiation into light detectable by the detector pixels.

18. The machine as claimed in claim 16 wherein the processor is programmed to use the predetermined triggering sequence, the pixels including a plurality of first pixels and a plurality of second pixels each adjacent one of the plurality of first pixels, and the triggering sequence controls integration time of the pixels so that integration time of the plurality of first pixels in a column is different from the plurality of second pixels by a predetermined time.

19. The machine as claimed in claim 16 wherein the processor is programmed to use the charge amplifiers and the charge amplifiers controllably amplify charges retrieved from the pixels so that amplification levels of adjacent pixels in a row are different.

20. The machine as claimed in claim 16 wherein the processor is programmed with a reconstruction algorithm.

21. The machine as claimed in claim 20 wherein the processor is programmed to combine the high and low sensitivity data prior to using the reconstruction algorithm.

22. The machine as claimed in claim 20 wherein the reconstruction algorithm uses the high and low sensitivity data.

23. The machine as claimed in claim 16, wherein the detector discards data from pixels that saturate.

24. The machine as claimed in claim 16, further including an x-ray source generating x-ray radiation received by the detector.

25. An imaging machine comprising:
    a radiation source;
    a flat panel detector, the detector including an array of detector pixels and a control line provided for each pixel row to activate each pixel in each respective row, the detector further including a converter to convert radiation into light detectable by the detector pixels, the detector having a predetermined triggering sequence controlling integration time of the pixels so that integration times of adjacent pixels are different in a predetermined manner to obtain high and low sensitivity data from the adjacent pixels; and
    a processor for reconstructing an image using the high and low sensitivity data from the detector to extend a dynamic range of the detector.

26. The machine as claimed in claim 25 wherein the processor generates the image using a reconstruction algorithm.

27. The machine as claimed in claim 26, wherein the high and low sensitivity data are combined prior to using the reconstruction algorithm.

28. The machine as claimed in claim 26, wherein the reconstruction algorithm determines whether at least one of the adjacent pixels is saturated.

29. An imaging machine comprising:
    a radiation source;
    a flat panel detector, the detector including an array of detector pixels and a control line provided for each pixel row to activate each pixel in each respective row, the detector further including a converter to convert radiation into light detectable by the detector pixels;
    at least one optical mask between the detector pixels and the converter, the at least one optical mask having different transparencies for adjacent pixels of the array to obtain high and low sensitivity data from the adjacent pixels; and
    a processor for reconstructing an image using the high and low sensitivity data from the detector to extend a dynamic range of the detector.

30. The machine as claimed in claim 29, wherein the processor uses the high and low sensitivity data in a reconstruction algorithm to generate the image at the extended dynamic range.

31. An imaging machine comprising:
    a radiation source;
    a flat panel detector, the detector including an array of detector pixels and a control line provided for each pixel row to activate each pixel in each respective row, the detector further including a converter to convert radiation into light detectable by the detector pixels;
    a plurality of charge amplifiers having different amplifications for adjacent pixels to obtain high and low sensitivity data from the adjacent pixels; and
    a processor for reconstructing an image using the high and low sensitivity data from the detector to extend a dynamic range of the detector.

32. The machine as claimed in claim 31, wherein the processor uses the high and low sensitivity data in a reconstruction algorithm to generate the image at the extended dynamic range.

* * * * *

UNITED STATES PATENT AND TRADEMARK OFFICE
CERTIFICATE OF CORRECTION

PATENT NO. : 6,868,138 B2
DATED : March 15, 2005
INVENTOR(S) : Neal H. Clinthorne and Predrag Sukovic It is certified that error appears in the above-identified patent and that said Letters Patent is hereby corrected as shown below:

<u>Column 1,</u>
Line 7, after "the title" insert
-- STATEMENT REGARDING FEDERALLY SPONSORED
RESEARCH OR DEVELOPMENT This invention was made with government support under NIH Grant No. CA65637. The government has certain rights in the invention. --

Signed and Sealed this

Seventh Day of June, 2005

JON W. DUDAS
*Director of the United States Patent and Trademark Office*